(12) United States Patent
Schlesiger

(10) Patent No.: US 12,161,127 B2
(45) Date of Patent: Dec. 10, 2024

(54) APPARATUS AND METHOD FOR CONVEYING ARTICLES OF THE FOOD PROCESSING INDUSTRY

(71) Applicant: FPI Food Processing Innovation GmbH + Co. KG, Lübeck (DE)

(72) Inventor: Oliver Schlesiger, Lübeck (DE)

(73) Assignee: FPI FOOD PROCESSING INNOVATION GMBH + CO. KG, Lübeck (DE)

( * ) Notice: Subject to any disclaimer, the term of this patent is extended or adjusted under 35 U.S.C. 154(b) by 64 days.

(21) Appl. No.: 18/077,080

(22) Filed: Dec. 7, 2022

(65) Prior Publication Data

US 2023/0172216 A1 Jun. 8, 2023

(30) Foreign Application Priority Data

Dec. 7, 2021 (EP) .................................... 21212814

(51) Int. Cl.
*A22B 7/00* (2006.01)
*B65G 9/00* (2006.01)

(52) U.S. Cl.
CPC .............. *A22B 7/003* (2013.01); *B65G 9/004* (2013.01); *B65G 2201/0202* (2013.01)

(58) Field of Classification Search
CPC ................ A22B 7/003; A22C 21/0053; B65G 2201/0202; B65G 9/004
USPC ......................................................... 452/188
See application file for complete search history.

(56) References Cited

U.S. PATENT DOCUMENTS

| | | | |
|---|---|---|---|
| 3,263,270 A | 8/1966 | Crawford et al. | |
| 3,507,003 A * | 4/1970 | Shadley ............. | A22C 21/0007 452/183 |
| 3,686,712 A * | 8/1972 | Lewis ................ | A22C 21/0007 452/179 |
| 3,766,604 A * | 10/1973 | Lunn .................... | A22C 15/003 452/187 |
| 6,764,393 B1 | 7/2004 | Hazenbroek et al. | |

(Continued)

FOREIGN PATENT DOCUMENTS

DE 3437070 A1 4/1986
DE 60316104 T2 6/2008

*Primary Examiner* — Richard T Price, Jr.
(74) *Attorney, Agent, or Firm* — Dinmsore & Shohl LLP

(57) ABSTRACT

A conveying apparatus for food-processing industry articles includes a conveying device to convey articles in a transport direction with holding elements adapted for receiving the articles. At least one guide extends in the transport direction, and guides guide elements arranged thereon in the transport direction. One holding element is vertically adjustably arranged on each guide element. Controllable adjusting means are arranged on the conveying line for adjusting the vertical position of the holding elements relative to the respective guide element. The adjusting means controllably come into adjusting engagement with passing holding elements to adjust the holding element vertical position. Each holding elements is arranged on the respective guide element by a self-holding device configured such that the holding element is upwardly movable relative to the guide element against gravity and is downwardly releasably locked in a stop position. An assembly for processing articles and corresponding methods are also provided.

24 Claims, 8 Drawing Sheets

(56) References Cited

U.S. PATENT DOCUMENTS

| | | |
|---|---|---|
| 7,614,941 B2 * | 11/2009 | van den Nieuwelaar .................. A22C 21/0069 452/185 |
| 9,687,007 B2 * | 6/2017 | Inoue ................. A22C 21/0069 |
| 9,763,459 B2 * | 9/2017 | Hazenbroek ....... A22C 21/0007 |
| 2014/0098608 A1 | 6/2014 | Barkley et al. |
| 2019/0038231 A1 | 2/2019 | Sugiyama et al. |
| 2020/0162753 A1 | 8/2020 | Sasai et al. |

\* cited by examiner

APPARATUS AND METHOD FOR CONVEYING ARTICLES OF THE FOOD PROCESSING INDUSTRY

CROSS-REFERENCE TO RELATED APPLICATIONS

This application claims priority to European Patent Application 21212814.4, filed Dec. 7, 2021, which is hereby incorporated by reference in its entirety.

FIELD OF THE INVENTION

The present invention relates to an apparatus for conveying articles of the food-processing industry and to an assembly for processing articles of the food-processing industry, comprising a conveying device adapted for conveying the articles along a conveying line in a transport direction and having a plurality of holding elements adapted for receiving the articles, at least one guide extending in the transport direction, which guide is adapted for guiding guide elements arranged thereon so as to be movable in the transport direction, wherein one of the holding elements is arranged on each of the guide elements so as to be vertically adjustable, controllable adjusting means arranged on the conveying line and adapted for adjusting the vertical position of the holding elements relative to the respective guide element, wherein the adjusting means are configured to come into adjusting engagement in a controllable manner with the holding elements as they pass in order to adjust the respective vertical position of the holding element.

The invention relates further to a method for conveying articles of the food-processing industry, comprising conveying the articles along a conveying line in a transport direction by means of a conveying device having a plurality of holding elements adapted for receiving the articles, guiding guide elements by means of at least one guide extending in the transport direction, wherein the guide elements are arranged so as to be movable in the transport direction, and wherein one of the holding elements is arranged on each of the guide elements so as to be vertically adjustable, adjusting the vertical position of the holding element in a controllable manner by means of controllable adjusting means arranged on the conveying line and adapted for adjusting the vertical position of the holding elements relative to the respective guide element, wherein the adjusting means come into adjusting engagement in a controllable manner with the holding elements as they pass in order to adjust the respective vertical position of the holding element.

The invention relates further to an assembly and to a method for processing articles of the food-processing industry.

The articles of the food-processing industry are in particular slaughtered animal bodies or parts thereof, for example poultry legs or viscera packages. When the slaughtered animal bodies are eviscerated, the viscera are removed from the abdominal cavity and conveyed separately. The organs are then separated, in particular into those which are suitable for consumption and into organs which are not edible for humans. In this process in particular, the vertical adjustability according to the invention during processing is advantageous. In principle, the present invention is suitable for conveying a wide variety of articles of the food-processing industry, provided that the articles can be isolated and conveyed in one piece. The present invention is suitable in particular for conveying articles which are conveyed in a hanging manner.

BACKGROUND OF THE INVENTION

In the industrial processing of articles of the food-processing industry, it is generally necessary during the handling and/or processing process to adapt the conveying height of the articles, that is to say the height of the article above the ground, in a controllably variable manner during conveying.

Thus, for example, it is well known in the processing of poultry legs, when deboning them, to change the height thereof during the conveying process in order to set it such that the poultry legs optimally come into engagement with the respective tools.

Document WO 2020/162753 A1 discloses shackles for conveying poultry in a hanging manner, the height of which shackles is adjustable. The shackle is adapted to be adjustable for vertical adjustment relative to a carrier in an axial direction by way of a shaft, which is guided through a bore of the carrier. In the carrier there is additionally arranged a retainer which is movable perpendicular to the axial direction and which is moved between a first position and a second position. In the first position, the retainer comes into engagement with the shaft, so that the shaft is held in a predetermined axial position relative to the carrier. In the second position, the retainer releases the shaft so that the shaft is able to move in the mentioned axial direction relative to the carrier.

However, the known solution for vertical adjustment has a number of disadvantages. Thus, by adjusting the retainer between the first and second positions, the shaft is retained on the carrier or released from the carrier again. To that end, it is necessary to actuate the retainer perpendicular to the axial direction. In order to set the desired vertical position of the shackles, the shackles must additionally be adjusted in the axial direction. For adjusting the vertical position of the shackles it is thus necessary both to move the retainer transverse to the axial direction and to adjust the shackle itself in the axial direction. Consequently, different guide elements are needed for both moving the retainer transverse to the axial direction and adjusting the shackle itself in the axial direction in its vertical position.

Vertically adjustable hanging conveying is further known, for example, from document DE 34 37 070 A1. The desired vertical position is locked by means of radially displaceable stop elements.

SUMMARY OF THE INVENTION

The object of the present invention is, therefore, to propose an apparatus which allows the vertical position of the conveyed articles to be adjusted as simply as possible with as low an outlay as possible in terms of apparatus. In addition, it is an object of the present invention to provide an apparatus which robustly and reliably permits the mentioned vertical adjustment of the articles. The object consists further in proposing a corresponding method. The object consists also in proposing an assembly and a method for processing the articles of the food-processing industry.

The object is achieved by an apparatus having the features mentioned hereinbefore in that each of the holding elements is arranged on the respective one of the guide elements by means of a self-holding device which is so configured that the holding element is movable relative to the guide element in the upward direction against the force of gravity and in the downward direction the holding element is releasably locked on the guide element in a stop position. The self-holding device according to the invention has the advantage that the holding element, in the case of a downward movement, is automatically locked on the guide element in a defined lower position, namely in the stop position, on the guide element. In other words, the self-holding device is self-locking.

By contrast, if the holding element is lifted in the upward direction by means of the adjusting means, the holding element is released from the stop position and can then move freely relative to the guide element into any desired vertical position. This has the advantage that, for adjusting the vertical position of the conveyed articles by means of the adjusting means, the holding elements are acted upon solely in the axial direction in order to adjust the vertical position thereof. Consequently, the outlay in terms of apparatus for adjusting the vertical position of the holding elements and of the articles conveyed therein is reduced to a minimum. In regions in which adjusting means for lifting the holding elements are not arranged, the holding element moves in the downward direction under the action of gravity and thus reaches the stop position, in which it is releasably locked on the guide element by means of the self-holding device. Advantageously, it is achieved by the present invention that a vertical adjustment of the holding elements is possible with the adjusting means acting solely in the axial direction. In this manner, the outlay in terms of apparatus is reduced to a minimum and at the same time robust and reliable vertical adjustment of the holding elements is achieved.

An expedient embodiment of the invention is characterised in that the self-holding device comprises a hollow cylinder and an inner cylinder guided through the hollow cylinder, wherein the hollow cylinder is arranged on the guide element and the inner cylinder is arranged on the holding element, and wherein the hollow cylinder comprises at least one receiving space for receiving at least one stop element, which are adapted to come into frictional engagement with the inner cylinder in the stop position. In particular, the receiving space and the stop elements are so configured and adapted that the stop elements move solely in the axial direction. In other words, the stop elements are so arranged in the receiving space that they are adapted to be free of radial movement. Further preferably, the geometry of the receiving space and the arrangement of the stop elements therein are so adapted that the stop elements in the stop position come into frictional engagement with the inner cylinder, so that the inner cylinder is releasably connected to the hollow cylinder by frictional engagement by way of the stop elements and thus the holding element is releasably locked on the guide element.

A preferred further development of the invention is distinguished in that the receiving space is in the form of an annular space for receiving a plurality of stop elements. Advantageously, the stop elements are thus arranged between the outer surface of the inner cylinder and the inner surface of the hollow cylinder without play. In this manner, the stop elements are in such close contact with the inner cylinder that, in the case of a relative movement of the holding element in the downward direction, the mentioned frictional engagement comes about and the holding element is locked in its stop position on the guide element in such a manner that it is releasable again. Advantageously, the stop elements are spherical.

A further expedient embodiment of the invention is characterised in that the receiving space is configured to taper in the downward direction. It is thereby achieved that the stop elements, as a result of a downward movement of the holding elements in the stop position, reach a clamped position in which the frictional forces between the inner cylinder, the stop elements and the outer cylinder are sufficiently great to bring the above-mentioned components into a clamp fit preventing further movement relative to one another. A further advantage consists in that, as a result of the tapered receiving space, the stop elements are likewise pressed against the outer surface with a greater contact pressure as the weight force of the articles arranged on the holding elements increases. Consequently, as the weight force of the articles increases, the contact pressure acting on the outer surfaces of the inner cylinder also increases, so that the frictional engagement is increased. This assists the self-locking function of the self-holding device according to the invention.

A preferred further development of the invention is distinguished in that at least one spring element is arranged in the receiving space, which spring element is adapted for applying a spring force to the stop elements in the downward direction. Advantageously, the stop elements—in addition to the force of gravity already acting thereon—are thus pressed in the downward direction with the constant application of a spring force, so that they are always in close contact, under preloading, with the inner cylinder and do not have any radial play. It is thereby ensured that the stop elements immediately come into frictional engagement in the case of a downward movement of the holding elements and locks the holding element in the stop position on the guide element.

A further expedient embodiment of the invention is characterised in that a sliding sleeve is arranged around the inner cylinder in the receiving space beneath the stop elements, which sliding sleeve is adapted to be movable in the stop position in the longitudinal direction of the inner cylinder by means of an actuating element in order to release the stop elements from frictional engagement. This has the advantage that, by lifting the actuating element against the direction of gravity, the sliding sleeve is moved upwards and thus the stop elements are likewise lifted in the longitudinal axial direction. The frictional engagement that is present in the stop position is thereby eliminated and locking of the holding element on the guide element is eliminated. The actuating element connected to the sliding sleeve is therefore configured to release the locking that is present in the stop position by moving the actuating element upwards relative to the guide element. In this manner, the actuating element permits both controllably variable release and controllably variable locking of the holding element on the guide element.

A preferred further development of the invention is distinguished in that the adjusting means are in the form of pivotable sliding surface elements which are adapted to be controllably pivotable for lifting the holding elements from a standby position into a lifted position. In other words, the sliding surface elements are so configured that they come into engagement with the holding elements in such a manner that, depending on their respective pivot position, the holding elements remain at their respective height or are lifted as a result of the respective pivot position of the sliding surface elements from the standby position into the lifted position. This has the advantage that the respective vertical position of the holding elements can be controllably variably changed on passing the respective sliding surface element.

A further expedient embodiment of the invention is characterised in that a control head is arranged at the upper free end of the guide element, which control head is configured to come into guiding contact with the sliding surface elements. Preferably, the sliding surface elements are so configured that they comprise two paired sliding surfaces which extend along the conveying line in the transport direction. These sliding surfaces are so spaced apart from one another that the guide element engages between them during the conveying process, wherein the control head abuts each of the sliding surfaces laterally.

As a result of pivoting of the sliding surface elements and the associated change in the angular position of the sliding surfaces, the above-described vertical adjustment of the guide elements and of the holding elements is effected. To that end, the width of the control head is preferably chosen to be greater than the smallest distance of the two sliding surfaces from one another, so that the control head engages over the sliding surfaces at least partially and in this manner comes into guiding contact.

Further preferably, ball bearings are arranged on the control head in pairs on opposite sides, which ball bearings are adapted to roll over the sliding surfaces. Further preferably, the control head comprises four of the mentioned ball bearings, which are arranged on the control head offset in each case by 90°. This has the advantage that the guide and the holding elements can be pivoted about the longitudinal axis in order to rotate the articles about the longitudinal axis during processing so as to bring them into a more advantageous position for processing.

A preferred further development of the invention is distinguished in that the adjusting means further comprise control means which are adapted for lowering the holding elements from the lifted position into the standby position, and thereby come into engagement with the actuating element in order to release the stop elements. In other words, the control means are adapted for acting on the actuating element in such a manner that locking between the holding element and the guide element is released so that they can move freely relative to one another along the longitudinal axis at least substantially perpendicular or transverse to the conveying direction. Substantially perpendicular means either perpendicular or deviating by a small angle from the perpendicular. In this manner, the holding elements can be lowered as described above.

The object is further achieved by a corresponding assembly having the features mentioned hereinbefore in that the assembly comprises the above-described apparatus for conveying articles of the food-processing industry and at least one processing station configured for processing the articles, wherein the apparatus is adapted for adjusting the vertical position of the articles during conveying in accordance with the processing height specified for processing of the articles by means of the at least one processing station. Advantageously, it is thus possible to optimally adapt the vertical position of the articles to be processed automatically during the conveying process to the circumstances of the respective processing station. Optimal processing of the articles is thus always ensured.

According to a further preferred embodiment, the articles are poultry or poultry parts. In particular, the articles are poultry legs and the processing stations are adapted to debone the poultry legs. Specifically, the processing of poultry or poultry parts generally requires the vertical position of the conveyed articles to be changed so that they can optimally be processed by means of the processing stations. The assembly according to the invention is therefore configured and adapted in particular for the automatic processing of poultry legs.

The object is further achieved by a corresponding method having the features mentioned hereinbefore, which method is distinguished by freeing the movability of the holding element relative to the guide element in the upward direction against the force of gravity and releasably locking each of the holding elements on the respective guide element in the stop position by means of a self-holding device.

The advantages associated with the apparatus according to the invention apply analogously also to the method according to the invention. Therefore, in order to avoid repetition, reference will be made in connection with the method to the preferences of the apparatus which have already been mentioned, and in the following text only the advantages of the method will additionally be explained in greater detail.

The freeing and releasable locking of the holding elements on the respective guide element by means of the self-holding device has the advantage that the holding element, in the case of a downward movement, is automatically locked on the guide element in a defined lower position, namely in the stop position, on the guide element. By contrast, if the holding element is lifted in the upward direction by means of the adjusting means, the holding element is released from the stop position and can then move freely relative to the guide element into any desired vertical position. The adjustment of the vertical position of the conveyed articles thus takes place by means of the adjusting means in such a manner that the holding elements are acted upon solely in the axial direction in order to adjust their vertical position. Consequently, the outlay in terms of apparatus and process technology for adjusting the vertical position of the holding elements and of the articles conveyed therein is reduced to a minimum.

In regions in which adjusting means for lifting the holding elements are not arranged, the holding element moves in the downward direction under the action of gravity and thus reaches the stop position, in which it is releasably locked on the guide element by means of the self-holding device. Advantageously, it is achieved by the present invention that a vertical adjustment of the holding elements is possible with the adjusting means acting solely in the axial direction. In this manner, the outlay in terms of apparatus is reduced to a minimum and at the same time robust and reliable vertical adjustment of the holding elements is achieved.

A further expedient embodiment of the invention is characterised in that the self-holding device comprises a hollow cylinder and an inner cylinder guided through the hollow cylinder, wherein the hollow cylinder is arranged on the guide element and the inner cylinder is arranged on the holding element, and wherein the hollow cylinder comprises at least one receiving space for receiving at least one of the stop elements, and in the stop position the stop elements come into frictional engagement with the inner cylinder.

A preferred further development of the invention is distinguished in that frictional engagement is effected by a plurality of stop elements arranged in the receiving space, which is in the form of an annular space. Advantageously, the stop elements move between the outer surface of the inner cylinder and the inner surface of the hollow cylinder without play. The stop elements are thus in such close contact with the inner cylinder that, in the case of a relative movement of the holding elements in the downward direction, the mentioned frictional engagement comes about and the holding element is locked in its stop position on the guide element in such a manner that it is releasable again.

A further expedient embodiment of the invention is characterised in that spheres are used as the stop elements.

A further expedient embodiment of the invention is characterised by effecting frictional engagement in the stop position by clamping the stop elements in the receiving space, which tapers in the downward direction. The stop elements, as a result of a downward movement of the holding elements in the stop position, thus reach a clamped position. In this clamped position, the frictional forces between the inner cylinder, the stop elements and the outer cylinder are sufficiently great to bring the above-mentioned components into a clamp fit preventing further movement relative to one another. A further advantage consists in that, as a result of the tapered receiving space, the stop elements are likewise pressed against the outer surface with a greater contact pressure as the weight force of the articles arranged on the holding elements increases. Consequently, as the weight force of the articles increases, the contact pressure acting on the outer surfaces of the inner cylinder also increases, so that the frictional engagement is increased. This assists the self-locking function of the self-holding device according to the invention.

A further expedient embodiment of the invention is characterised by applying a spring force to the stop elements in the downward direction by means of at least one spring element arranged in the receiving space. Advantageously, the stop elements—in addition to the force of gravity already acting thereon—are thus pressed in the downward direction with the constant application of a spring force, so that they are always in close contact, under preloading, with the inner cylinder and do not have any radial play. It is thereby ensured that the stop elements immediately come into frictional engagement in the event of a downward movement of the holding elements and locks the holding element in the stop position on the guide element.

A preferred further development of the invention is distinguished by releasing the stop elements from frictional engagement in the stop position by means of a sliding sleeve arranged around the inner cylinder in the receiving space beneath the stop elements, by moving the sliding sleeve in the longitudinal direction of the inner cylinder by means of an actuating element. By lifting the actuating element against the direction of gravity, the sliding sleeve is thus advantageously moved upwards and the stop elements are likewise lifted in the longitudinal axial direction. The frictional engagement that is present in the stop position is thereby eliminated and locking of the holding element on the guide element is released. Therefore, by adjusting the actuating element, both controllably variable release and controllably variable locking of the holding element on the guide element is possible.

A further expedient embodiment of the invention is characterised by lifting the holding elements from a standby position into a lifted position by controllable pivoting of the stop elements in the form of pivotable sliding surface elements. By pivoting the angle of inclination of the sliding surface elements, it is possible automatically to adapt the vertical position in a controllably variable manner to the respective desired height.

A further expedient embodiment of the invention is characterised by bringing the sliding surface elements into guiding contact with a control head arranged at the upper free end of the guide element.

A preferred further development of the invention is distinguished by engagement of adjusting means with the actuating element in order to release the stop elements and lower the holding elements from the lifted position into the standby position.

The object is also achieved by the method mentioned hereinbefore for processing articles of the poultry-processing industry, wherein this method comprises the above-described steps of the method for conveying articles of the poultry-processing industry and further comprises processing the articles by means of at least one processing station, wherein the vertical position of the articles is adjusted during conveying in accordance with the processing height specified for processing of the articles by means of the at least one processing station. Advantageously, it is thus possible to optimally adapt the vertical position of the articles to be processed automatically during the conveying process to the circumstances of the respective processing station. Optimal processing of the articles is thus always ensured.

A further expedient embodiment of the invention is characterised in that the articles are poultry or poultry parts. Specifically the processing of poultry or poultry parts generally requires the vertical position of the conveyed articles to be changed so that they can optimally be processed by means of the processing stations. The method according to the invention is therefore configured and adapted in particular for the automatic processing of poultry legs.

According to a further preferred embodiment, the articles are poultry or poultry parts. In particular, the articles are poultry legs and the processing stations are adapted to debone the poultry legs. Specifically, the processing of poultry or poultry parts generally requires the vertical position of the conveyed articles to be changed so that they can optimally be processed by means of the processing stations. The assembly according to the invention is therefore configured and adapted in particular for the automatic processing of poultry legs.

BRIEF DESCRIPTION OF THE DRAWINGS

Further preferred and/or expedient features and embodiments of the invention will become apparent from the dependent claims and the description. Particularly preferred embodiments will be explained in greater detail with reference to the accompanying drawing. In the drawing:

DETAILED DESCRIPTION OF THE INVENTION

Figure 4:
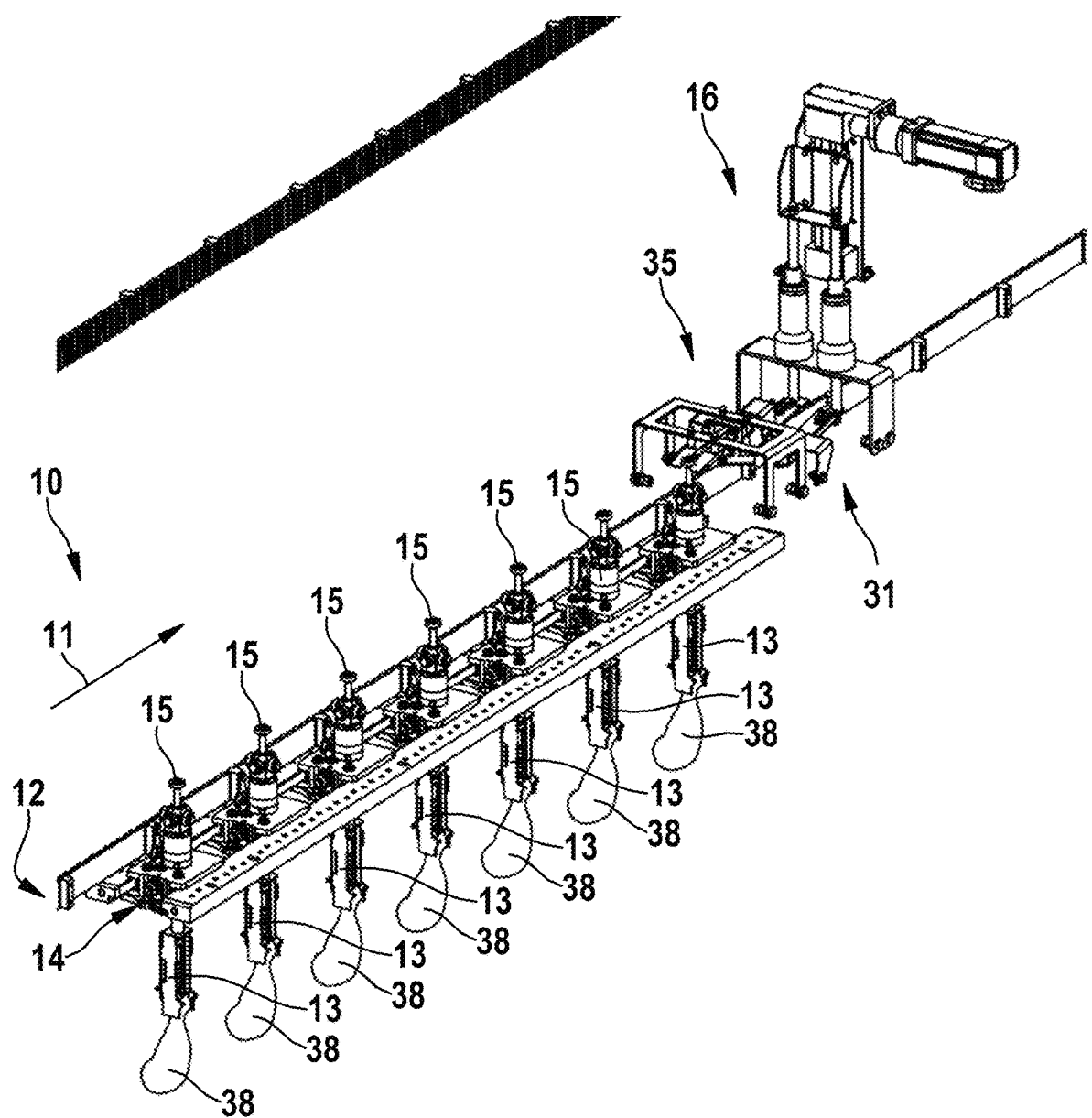
FIG. 4 is a perspective view of the assembly according to the invention.

The apparatus according to the invention comprises a conveying device 12 adapted for conveying the articles—not shown in the drawing—along a conveying line 10 in a transport direction 11. The conveying device 12 comprises a plurality of holding elements 13 adapted for receiving the articles. As is shown in FIG. 4, the apparatus has at least one guide 14 extending in the transport direction 11, which guide is adapted for guiding guide elements 15 arranged thereon so as to be movable in the transport direction 11. The guide elements 15 thus form movable receiving elements which move preferably continuously in the transport direction. One of the holding elements 13 is arranged on each of the guide elements 15 so as to be vertically adjustable.

Controllable adjusting means 16 are arranged on the conveying path 10. The adjusting means 16 are adapted for adjusting the vertical position of the holding elements 13 relative to the respective guide element 15. The adjusting means 16 are configured and adapted to come into adjusting engagement with the holding elements 13 as they pass in order to adjust the respective vertical position of the holding element 13. In other words, the adjusting means 16 are so adapted that they act upon the holding elements 13 as they pass and, according to the position thereof, effect a change in the vertical position of the holding element 13.

Each of the holding elements 13 is arranged on the respective guide element 15 by means of a self-holding device 17. The self-holding device 17 is so adapted that the holding element 13 is movable relative to the guide element 15 in an upward direction against the force of gravity. By contrast, in the downward direction, the holding element 13 is releasably locked on the guide element 15 in a stop position. Consequently, an upward movement of the holding element 13 is always possible, while in the case of a downward movement, automatic locking is effected. In other words, the self-holding device 17 is self-locking.

The self-holding device 17 is further adapted for releasing the holding element 13 from the stop position so that the holding element can then move freely relative to the guide element 15 into any desired vertical position, provided that the holding element 13 is lifted in the upward direction by means of the adjusting means 16. Thus, in order to adjust the vertical position of the conveyed articles by means of the adjusting means 16, it is necessary to act upon the holding elements 13 solely in the axial direction. Consequently, the outlay in terms of apparatus for adjusting the vertical position of the holding elements 13 and of the articles conveyed thereby is reduced to a minimum.

Advantageously, the self-holding device 17 is configured, in regions in which adjusting means for lifting or holding the holding elements 13 are not arranged, to permit a downward movement, induced by the force of gravity, of the respective holding element 13 until the holding element automatically reaches the stop position. The self-holding device 17 is configured to lock the holding element 13, on reaching the stop position, on the guide element 15 in such a manner that it can be released again.

Figure 1:
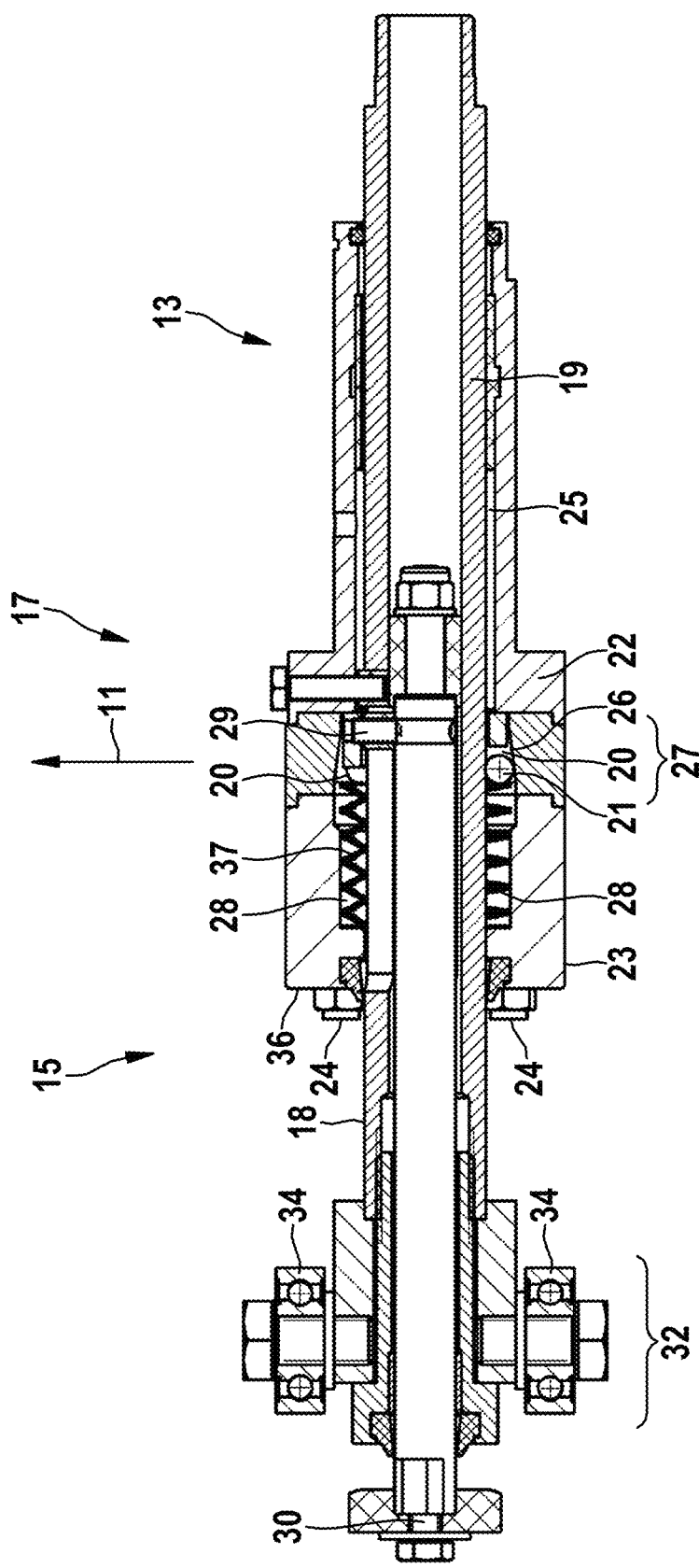
FIG. 1 is a cross-sectional view of the holding and guide element according to the invention for conveying the articles.
Figure 2:
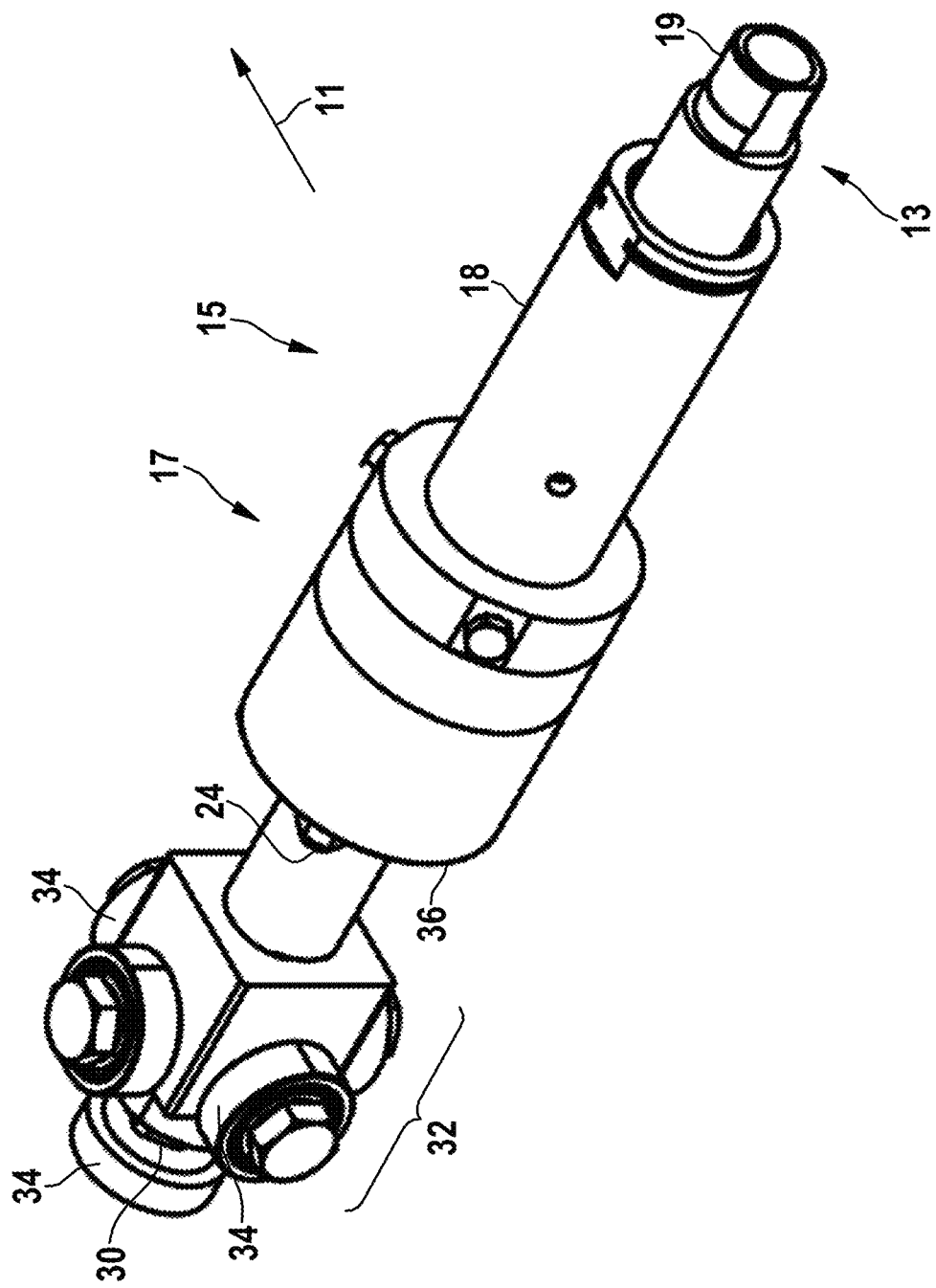
FIG. 2 is a perspective view of the apparatus parts shown in FIG. 1.

As is shown in FIG. 1, the self-holding device 17 comprises a hollow cylinder 18 and an inner cylinder 19 guided through the hollow cylinder 18. The hollow cylinder 18 is arranged on the guide element 15 or is part of the guide element 15. The inner cylinder 19 is arranged on the holding element 13 or forms part of the holding element. The hollow cylinder 18 comprises at least one receiving space 20, which is configured and adapted for receiving at least one stop element 21. The hollow cylinder 18 is, for example—as is shown in the drawing—widened in the region of the receiving space 20, that is to say has a correspondingly larger diameter relative to the other portions. The receiving space 20 can alternatively also be formed by a separate housing, which is arranged on the hollow cylinder 18. Preferably, the hollow cylinder 18 is widened on the receiving space side and forms a housing seat 22 on which there is arranged a cylindrical housing 23 surrounding the receiving space 20. The housing 23 is optionally screwed to the housing seat 22 by means of screws 24, which are guided through a head side 36 of the housing 23.

The stop elements 21 come into frictional engagement with the inner cylinder 19 in the stop position. As can be seen in FIG. 1, in the case of a downward movement of the inner cylinder 19, the stop elements are moved in the direction towards the holding element 13 owing to the frictional contact with the inner cylinder 19 and come to lie in the receiving space 20 on the holding element side in order, in the stop position, to form a clamp connection with the inner cylinder 19 and the hollow cylinder 18.

In particular, the internal geometry of the receiving space 20 is so adapted that the stop elements 21 move solely in the axial direction. The stop elements 21 are thus preferably arranged in the receiving space 20 in such a manner that they are adapted to be free of radial movement. Further preferably, the geometry of the receiving space 20 and the arrangement of the stop elements 21 therein are so adapted that the stop elements 21, in the stop position, come into frictional engagement with the inner cylinder 19, so that the inner cylinder 19 is releasably connected to the hollow cylinder 18 by frictional engagement by way of the stop elements 21. In this manner, the holding element 13 is releasably locked on the guide element 15.

As is shown in the drawing, the receiving space 20 is preferably in the form of an annular space for receiving a plurality of stop elements 21. The stop elements 21 are arranged between the outer surface 25 of the inner cylinder 19 and the inner surface 26 of the hollow cylinder 18 without play, in particular without radial play. This has the effect that the stop elements 21 are in such close contact with the inner cylinder 19 that, in the case of a relative movement of the holding element 13 in the downward direction, the mentioned frictional engagement comes about and the holding element 13 is locked in its stop position on the guide element 15 in such a manner that it can be released again. Preferably, the stop elements 21 are spherical.

Preferably, as can be seen in FIG. 1, the receiving space 20 is configured to taper in the downward direction. The receiving space 20 thus has a conical region 27. The inside diameter of the hollow cylinder 18 decreases in the direction towards the housing seat 22, or in the direction towards the inner cylinder 19, to such an extent that the stop elements 21 in the stop position develop a sufficient clamping force to ensure that the holding element 13 is locked on the guide element 15.

The stop elements 21, as a result of a downward movement of the holding element 13 into the stop position, thus reach a clamped position, or the mentioned clamp connection. In this position, the frictional forces between the inner cylinder 19, the stop elements 21 and the hollow cylinder 18 are sufficiently great to lock the above-mentioned components together and thus secure them against any further movement relative to one another.

As a result of the conical region 27 of the receiving space 20, the stop elements 21 are likewise pressed against the outer surface 25 of the inner cylinder 19 with a greater contact pressure as the weight force of the articles arranged on the holding elements 13 increases. Consequently, as the weight force of the articles increases, the contact pressure acting on the outer surfaces 25 of the inner cylinder 19 thus also increases, resulting in greater frictional engagement. This additionally assists the self-locking function of the self-holding device 17 according to the invention. It is not absolutely essential to provide the receiving space 20 with a conical region 27 in order to ensure the described locking function. As described above, the clamp connection also comes about when the stop elements 21 come to lie in that end of the receiving space 20 that is on the holding element side. However, the conical region 27 on the one hand assists as rapid a response as possible of the self-holding device 17, and on the other hand the radially acting clamping force component is thereby increased significantly compared to a solution without a conical region 27, and the clamping and locking action is thus improved significantly.

Preferably, at least one spring element 28 is arranged in the receiving space 20 and is adapted for applying a spring force to the stop element 21 in the downward direction, that is to say towards that end of the receiving space 20 that is on the holding element side. Advantageously, the stop elements 21—in addition to the force of gravity already acting thereon—are thus pressed in the downward direction with the constant application of a spring force, so that they are always in close contact, under preloading, with the inner cylinder 19 and do not have any radial play. The stop element 21 thus immediately comes into frictional engagement in the case of a downward movement of the holding element 13 relative to the guide element 15, in order to lock the two elements together in the stop position. Further preferably, a plurality of stop elements 21 are arranged in the receiving space 20. In this case, one of the spring elements 28 is associated with each of the stop elements 21.

As is shown in FIG. 1, a sliding sleeve 29 is movably arranged around the inner cylinder 19 in the receiving space 20 beneath the stop elements 21, that is to say on the holding element side. The sliding sleeve 29 is adapted and configured to be movable in translation in the longitudinal direction of the inner cylinder 19 by means of an actuating element 30, in order to move the stop element(s) 21 in the longitudinal direction out of the frictional engagement of the stop position. This has the advantage that, by lifting the actuating element 30 or moving the actuating element 30 away from the holding element 13 against the force of gravity, the sliding sleeve 29 is moved upwards and thus the stop elements 21 are likewise lifted in the longitudinal axial direction. The frictional engagement that is present in the stop position is thus eliminated and the locking of the holding element 13 on the guide element 15 is released. The actuating element 30, in cooperation with the sliding sleeve 29, is therefore adapted to both controllably variably release and controllably variably lock the holding element 13 on the guide element 15.

As is shown in FIG. 4, the adjusting means 16 are preferably in the form of pivotable sliding surface elements 31. They are thus adapted for controllably lifting the holding elements 13 from a standby position into a lifted position. To that end, the sliding surface elements 31 are so configured that they come into engagement with the holding elements 13. Depending on their respective pivot position, the holding elements 13 then remain at their respective height or are lifted as a result of the respective pivot position of the sliding surface elements 31 from the standby position into the lifted position. This has the advantage that the respective height of the holding elements 13 is adapted to be controllably variably changeable on passing the respective sliding surface element 31.

As can clearly be seen in FIG. 1, a control head 32 is arranged at the upper free end of the holding element 13. The control head is configured to come into guiding contact with the sliding surface elements 31. FIG. 4 shows that the sliding surface elements 31 are preferably so configured that they comprise two paired sliding surfaces 33 which extend along the conveying line 10 in the transport direction 11. The sliding surfaces 33 are further preferably spaced apart from one another so that the guide element 15 engages between them during the conveying process and the control head 32 abuts each of the sliding surfaces 33 laterally.

As a result of pivoting of the sliding surface elements 31 shown in FIG. 4 and the associated change in the angular position of the sliding surface 33, the above-described vertical adjustment of the holding elements 13 is effected. The width of the control head 32 is preferably chosen to be greater than the smallest distance between the two sliding surfaces 33. The control head 32 is thus preferably so adapted that it engages over the sliding surfaces 33 at least partially and accordingly abuts the sliding surfaces 33 on both sides.

Figure 3:
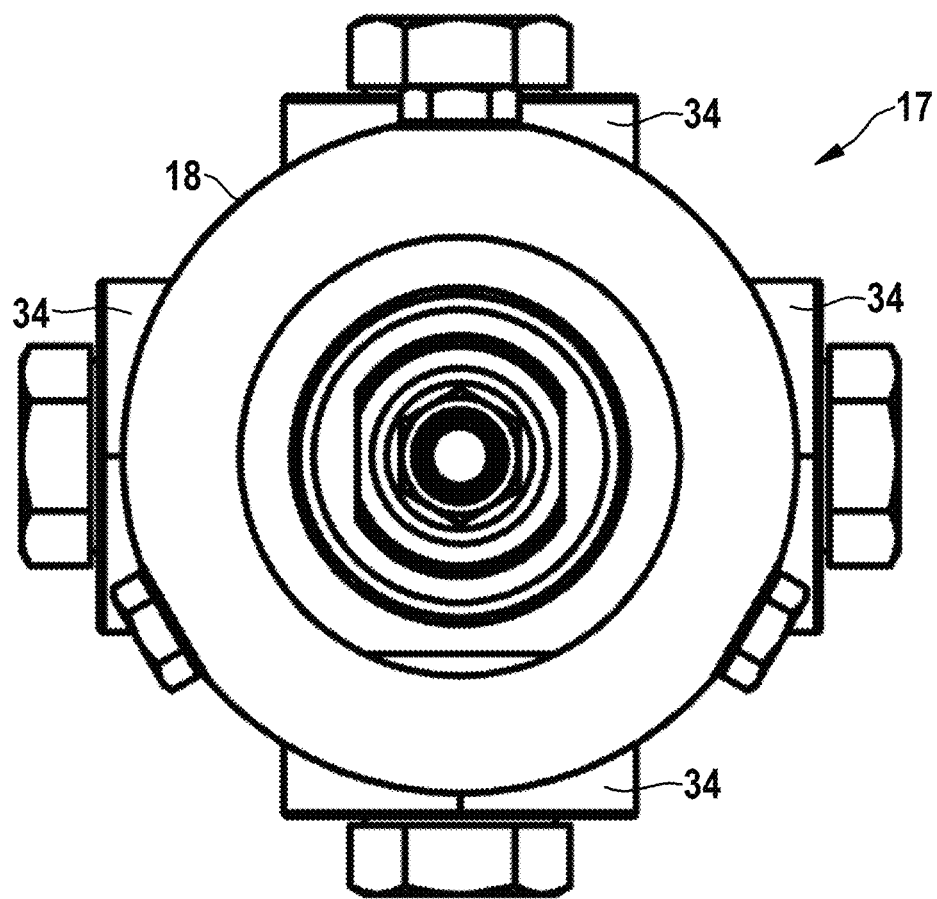
FIG. 3 is a plan view of the parts shown in FIGS. 1 and 2.

In FIG. 1, ball bearings 34 which are advantageously arranged on the control head 32 in pairs on opposite sides are shown. The ball bearings are adapted to roll over the sliding surfaces 33. FIG. 3 shows a preferred embodiment in which the control head 32 comprises four of the mentioned ball bearings 34. The ball bearings are arranged on the sides of the control head 32 offset in each case by 90°. The control head 32 is configured and adapted to be pivotable in 90° steps about the longitudinal axis by pivoting the guide element 15 about the longitudinal axis. Thus, during processing, the articles, rotated about the longitudinal axis, can be brought into an advantageous position for processing.

The adjusting means 16 preferably comprise further control means 35 which are adapted for lowering the holding elements 13 from the lifted position into the standby position. These control means 35 are so positioned on the conveying path 10 and adapted that they thereby come into engagement with the actuating element 30 through an engaging element 39 in order to release the stop elements 21. In other words, the control means 35 are adapted through the engaging element 39 to act upon the actuating element 30 by way of the control head 32 in such a manner that locking between the holding element 13 and the guide element 15 is released so that they can move freely relative to one another along the longitudinal axis transverse to the conveying direction 11. In this manner, the holding elements 13-as described above-can be lowered.

FIG. 4 shows, schematically, the assembly according to the invention, which comprises the above-described apparatus for conveying the mentioned articles, and at least one processing station—not shown in the drawing—configured for processing the articles. As described above, the apparatus according to the invention is adapted for adjusting the vertical position of the articles during conveying in accordance with the processing height specified for processing of the articles by means of the at least one processing station, in order to optimally adapt the vertical position of the articles to be processed automatically during the conveying process to the circumstances of the respective processing station. As is shown in FIG. 4, the assembly according to the invention comprises the conveying line 10, which is formed by the conveying device 12. The conveying device 12 comprises a plurality of holding elements 13, on each of which a poultry leg 38—shown by way of example in FIG. 4—is arranged in a hanging manner. The guide elements 15, which are conveyed in the transport direction 11 to the control means 35, are also visible in FIG. 4.

Figure 5:
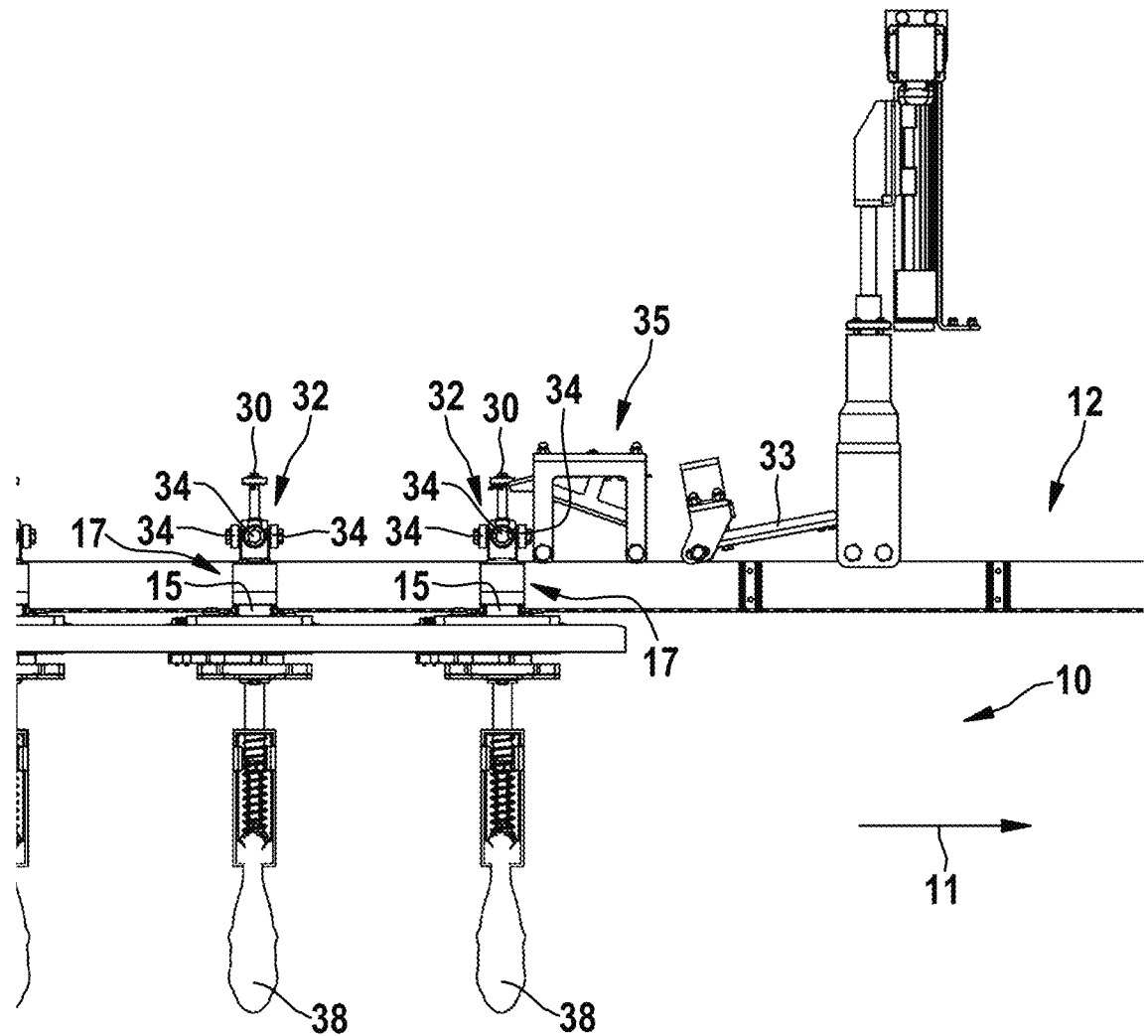
FIG. 5 is a side view of the assembly shown in FIG. 4.
Figure 8:
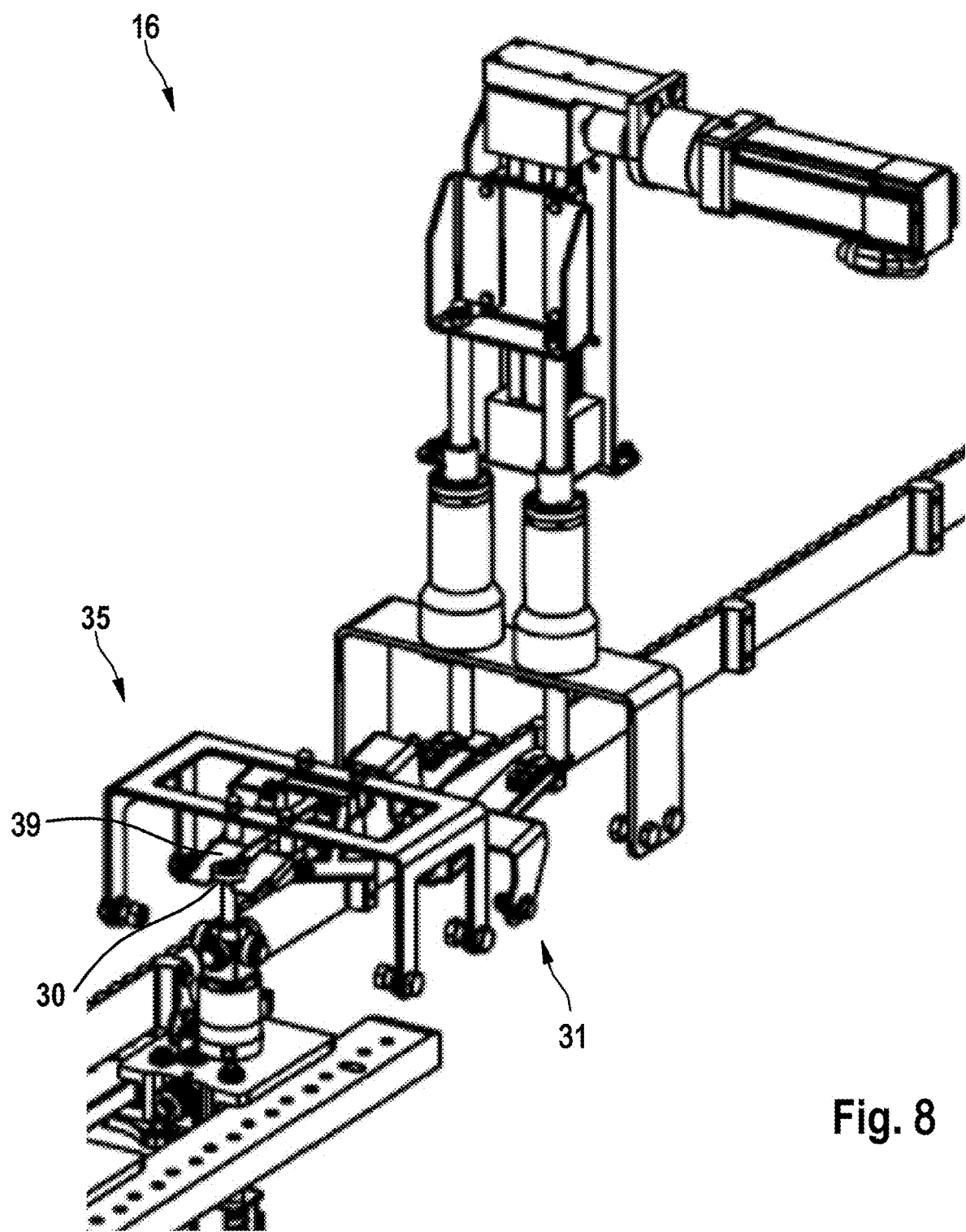
FIG. 8 is a closer view of the assembly shown in FIG. 4.

FIG. 5 is a side view of the assembly according to the invention shown in FIG. 4 having the conveying line 10, which is formed by the conveying device 12. The conveying device 12 comprises a plurality of holding elements 13, of which two are shown in FIG. 5. One of the poultry legs 38 is arranged in a hanging manner on each of these holding elements 13. Each of the holding elements 13 is arranged on the guide element 15 so as to be controllably movable in the longitudinal axial direction. By means of the self-holding device 17, the holding element is arranged-in the manner described above-on the guide element 15 so as to be controllably movable. In FIG. 5 there are additionally shown the control heads 32 with the ball bearings 34, which come into operative contact with the sliding surfaces 33. It can also be seen in FIG. 8 how the actuating element 30 interacts with the control means 35 through the engaging element 39.

Preferably, the articles are poultry or poultry parts. In particular, the articles are poultry legs. The processing station is accordingly preferably configured and adapted as a deboning station.

The method according to the invention for conveying the mentioned articles will be described in greater detail below only in relation to selected aspects, because the method steps have for a large part already been described in connection with the apparatus according to the invention.

As described above, the movability of the holding element 13 relative to the guide element 15 in the upward direction against the force of gravity is freed, on the one hand, and each of the holding elements 13 is releasably locked on the respective guide element 15 in a stop position in the downward direction by means of the self-holding device 17.

The freeing and releasable locking of the holding elements 13 on the respective guide element 15 by means of the self-holding device 17 has the result that the holding element 13, in the case of a downward movement, is automatically locked on the guide element 15 in a defined lower position, namely the stop position, with the guide element 15. By contrast, if the holding element 13 is lifted in the upward direction by means of the adjusting means 16, the holding element 13 is released from the stop position and can then move freely relative to the guide element 15 into any desired vertical position. Adjustment of the vertical position of the conveyed articles is thus carried out by means of the adjusting means 16 in such a manner that the holding elements 13 are acted upon solely in the axial direction.

In regions in which adjusting means 16 for lifting the holding elements 13 are not arranged, the holding element 13 moves in the downward direction under the force of gravity and thus automatically reaches the stop position. In that position, it is releasably locked on the guide element 15 by means of the self-holding device 17. A vertical adjustment with the adjusting means 16 acting solely in the axial direction is thus possible.

Frictional engagement, or the above-described clamp connection, is preferably effected by a plurality of stop elements 21 arranged in the receiving space 20 in the form of an annular space. To that end, the stop elements 21 advantageously move between the outer surface 25 of the inner cylinder 19 and the inner surface 26 of the hollow cylinder 18 without play, in particular without radial play. The stop elements 21 are thus in such close contact with the inner cylinder 19 that, in the case of a relative movement of the holding elements 13 in the downward direction, the mentioned frictional engagement comes about and the holding element 13 is locked in its stop position on the guide element 15 in such manner that it is releasable again.

Frictional engagement, or the formation of the described clamp connection, in the stop position is additionally effected by clamping the stop elements 21 in the receiving space 20, which tapers in the downward direction or has a conical region 27. The stop elements 21, as a result of a downward movement of the holding elements 13 in the stop position, thus reach a corresponding clamped position. In this clamped position, the frictional forces between the inner cylinder 19, the stop elements 21 and the hollow cylinder 18 are sufficiently great to bring the above-mentioned components into a clamp fit preventing further movement relative to one another and to lock them together.

As described above, by applying a spring force to the stop elements 21 in the downward direction by means of at least one spring element 28 arranged in the receiving space, the stop elements 21—in addition to the force of gravity already acting thereon—are pressed in the downward direction with the constant application of a spring force, so that they are always in close contact, under preloading, with the inner cylinder 19 and therefore do not have any radial play. It is thereby ensured that the stop elements 21 immediately come into frictional engagement in the case of a downward movement of the holding element 13 and lock the holding element 13 in the stop position on the guide element 15.

In accordance with the method according to the invention, the stop elements 21 are released from frictional engagement or the clamp connection in the stop position preferably by means of a sliding sleeve 29 which is arranged around the inner cylinder 19 in the receiving space 20 beneath the stop elements 21. To that end, the sliding sleeve 29 is moved in translation in the longitudinal direction of the inner cylinder 19 against the force of gravity, that is to say upwards, by means of an actuating element 30. As a result of this lifting of the actuating element 30 against the direction of gravity, the sliding sleeve 29 is thus moved upwards and the stop elements 21 are likewise lifted in the longitudinal direction. As a result, the frictional engagement or clamp connection that is present in the stop position is eliminated and the locking of the holding element 13 on the guide element 15 is released. Therefore, by adjusting the actuating element 30, both controllably variable release and controllably variable locking of the holding element 13 on the guide element 15 becomes possible.

Lifting of the holding elements 13 from a standby position into a lifted position is effected by controllable pivoting of the adjusting elements 16 in the form of pivotable sliding surface elements 31. By pivoting the angle of inclination of the sliding surface elements 31, it is possible automatically to adapt the vertical position in a controllably variable manner to the respective desired height.

Figure 6:
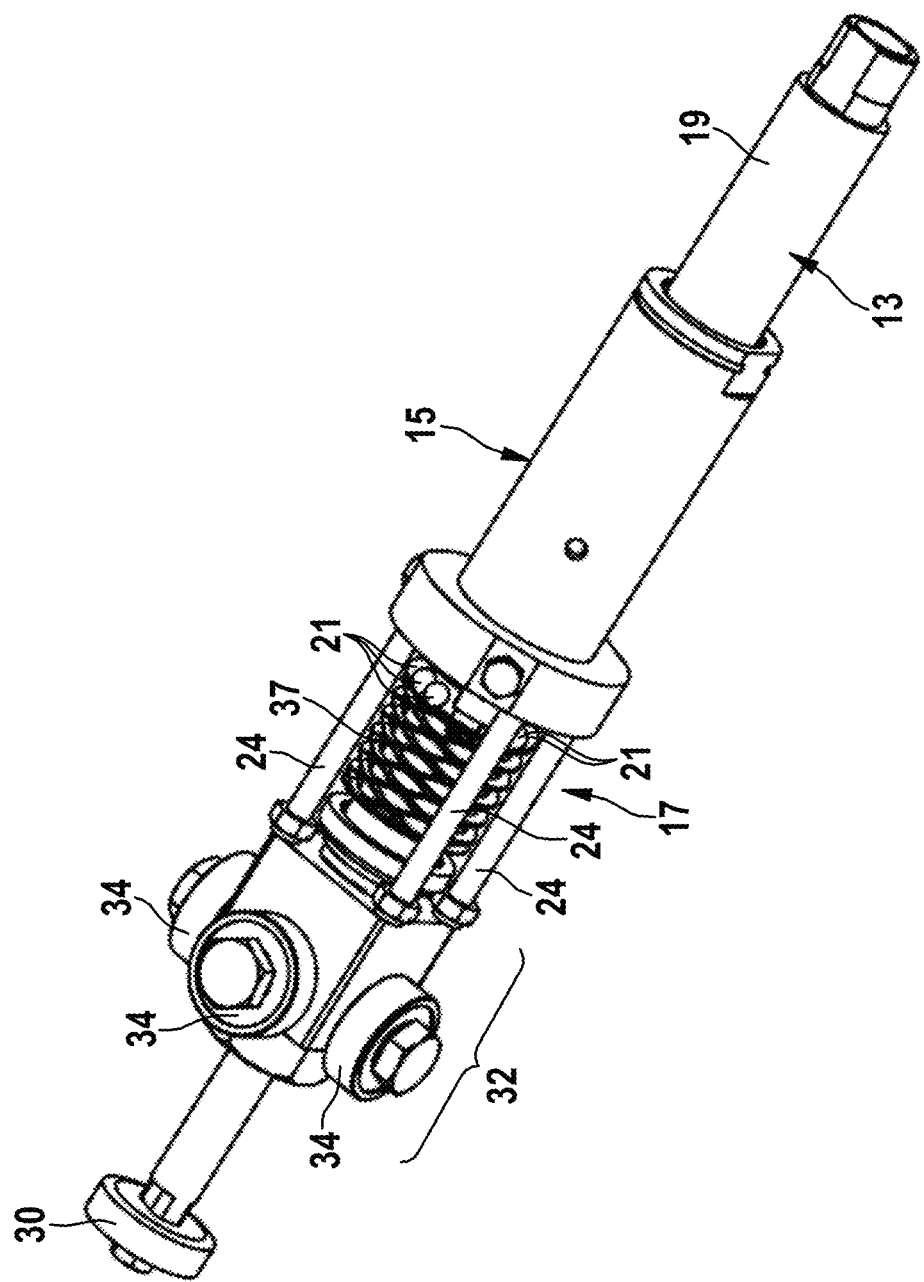
FIG. 6 is a perspective view of the holding and guide element and of the self-holding device with the housing faded out.

FIG. 6 is a perspective view of the holding elements 13 and of the guide element 15. The self-holding device 17 is shown with the housing faded out, so that there is a clear view of the spring element 37 and the stop elements 21. At the lower end, the inner cylinder 19 of the holding element 13, which penetrates into the guide element 15, can be seen. The upper end of the guide element 15 comprises the actuating element 30 and the control head 32 with the ball bearings 34.

Figure 7:
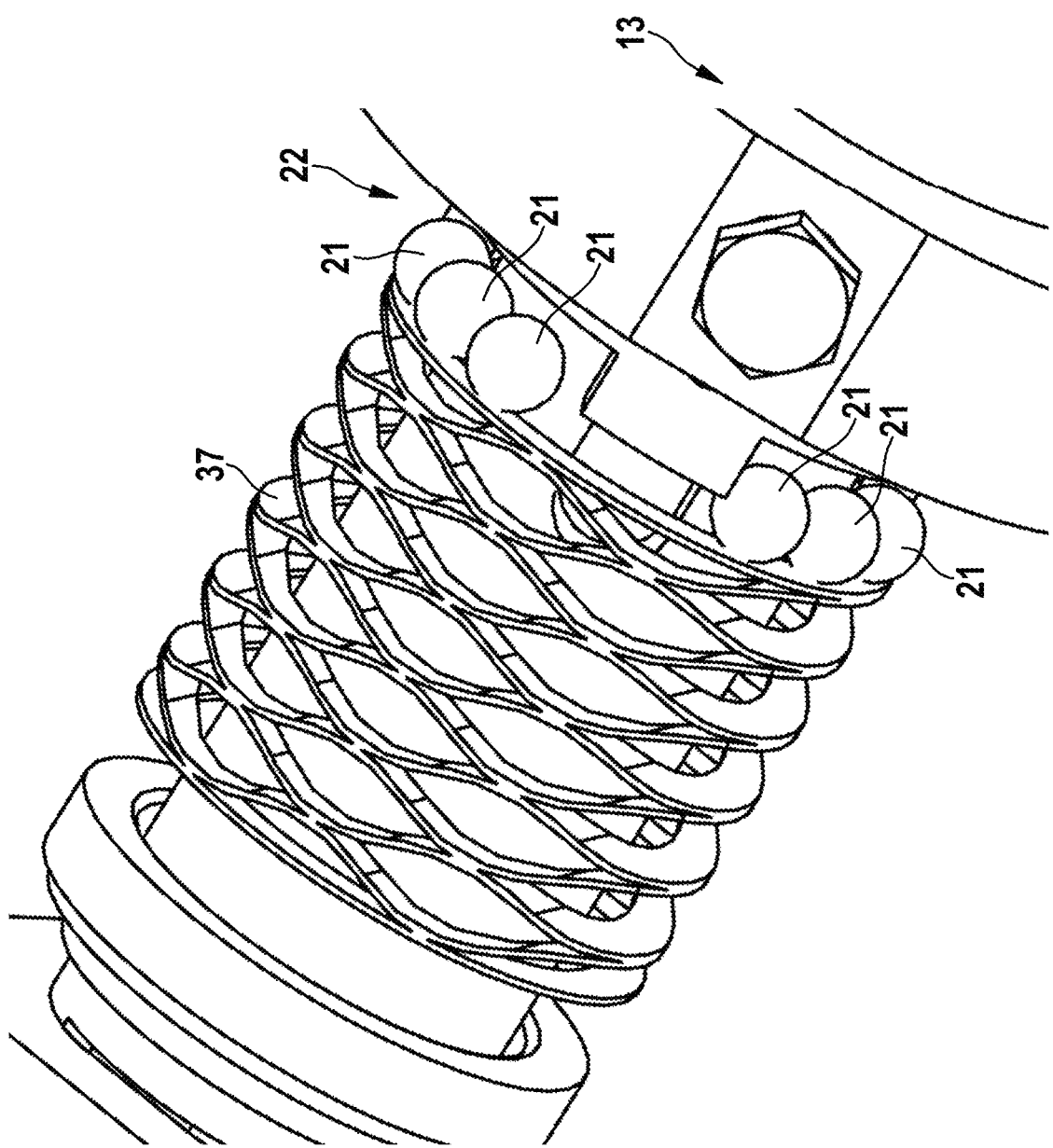
FIG. 7 is an enlarged view of a detail of FIG. 6, looking at the spring element 37; and h.

FIG. 7 is an enlarged view of a detail of FIG. 6, looking at the spring element 37. The spring element 37 is in operative connection with the stop elements 21, which are pressed by the spring element, under spring preloading, in the direction towards the housing seat 22. The spring element 37 is preferably—as shown in the drawing—configured and adapted as a wave spring element. To that end, the spring element 37 has the honeycomb-like cylindrical spring structure shown in FIGS. 6 and 7. The design as a wave spring element has the advantage of providing as uniform a spring force as possible on the stop elements 21 arranged distributed over the circumference. The spring element 37 can alternatively also be in the form of a spiral compression spring.

The present invention also includes the method mentioned hereinbefore for processing articles of the food-processing industry, wherein this method comprises the above-described steps of the method for conveying articles of the food-processing industry and further comprises processing the articles by means of at least one processing station—not shown in the drawing. The vertical position of the articles is thereby adjusted during conveying in accordance with the processing height specified for processing of the articles by means of the at least one processing station.

The invention claimed is:

1. An apparatus for conveying articles of the food-processing industry, comprising:
   a conveying device adapted for conveying the articles along a conveying line in a transport direction and having a plurality of holding elements adapted for receiving the articles;
   at least one guide extending in the transport direction, the guide being adapted for guiding guide elements arranged thereon so as to be movable in the transport direction, wherein one of the holding elements is arranged on each of the guide elements so as to be vertically adjustable;
   controllable adjusting means arranged on the conveying line and adapted for adjusting a vertical position of the holding elements relative to the respective guide element, wherein the adjusting means engage with the holding elements as they pass and vertically move the holding elements relative to the respective guide element in order to adjust the respective vertical position of the holding element;
   wherein each of the holding elements is arranged on the respective one of the guide elements by a self-holding device which is so configured that the holding element is movable relative to the guide element in an upward direction against a force of gravity and in a downward direction the holding element is releasably locked on the guide element in a stop position.

2. The apparatus according to claim 1, wherein the self-holding device comprises:
   a hollow cylinder; and
   an inner cylinder guided through the hollow cylinder; wherein;
   the hollow cylinder is arranged on the guide element and the inner cylinder is arranged on the holding element; and
   the hollow cylinder comprises at least one receiving space for receiving at least one stop element, the at least one stop element being adapted to come into frictional engagement with the inner cylinder in the stop position.

3. The apparatus according to claim 2, wherein the receiving space is in the form of an annular space for receiving a plurality of the stop elements.

4. The apparatus according to claim 3, wherein the stop elements are spherical.

5. The apparatus according to claim 2, wherein the receiving space is configured to taper in the downward direction.

6. The apparatus according to claim 2, further comprising at least one spring element arranged in the receiving space, the spring element being adapted for applying a spring force to the at least one stop element in the downward direction.

7. The apparatus according to claim 2, further comprising a sliding sleeve arranged around the inner cylinder in the receiving space beneath the at least one stop element, the sliding sleeve being adapted to be movable in the stop position in a longitudinal direction of the inner cylinder by an actuating element in order to release the at least one stop element from frictional engagement.

8. The apparatus according to claim 1, wherein the adjusting means are in the form of pivotable sliding surface elements which are adapted to be controllably pivotable for lifting the holding elements from a standby position into a lifted position.

9. The apparatus according to claim 8, further comprising a control head arranged at an upper free end of the guide element, the control head being configured to come into guiding contact with the sliding surface elements.

10. The apparatus according to claim 8, wherein the adjusting means further comprise control means which are adapted, for lowering the holding elements from the lifted position into the standby position, to come into engagement with the actuating element in order to release the at least one stop element.

11. An assembly for processing articles of the food-processing industry, comprising:
    an apparatus for conveying the articles according to claim 1; and
    at least one processing station configured for processing the articles;
    wherein the apparatus is adapted for adjusting the vertical position of the articles during conveying in accordance with a processing height specified for processing of the articles by the at least one processing station.

12. The assembly according to claim 11, wherein the articles are poultry or poultry parts.

13. A method for conveying articles of the food-processing industry, comprising:
    conveying the articles along a conveying line in a transport direction by a conveying device having a plurality of holding elements adapted for receiving the articles;
    guiding guide elements by at least one guide extending in the transport direction, wherein the guide elements are arranged so as to be movable in the transport direction, and wherein one of the holding elements is arranged on each of the guide elements so as to be vertically adjustable;
    controllably adjusting a respective vertical position of the holding elements by controllable adjusting means which are arranged on the conveying line and are adapted for adjusting the respective vertical position of the holding elements relative to the respective guide element, wherein the adjusting means engage with the holding elements as they pass and vertically move the holding elements relative to the respective guide element in order to adjust the respective vertical position of the holding element; and
    freeing a movability of the holding element relative to the guide element in an upward direction against a force of gravity and releasably locking each of the holding elements on the respective guide element in a stop position in a downward direction by a self-holding device.

14. The method according to claim 13, wherein the self-holding device comprises:
    a hollow cylinder and an inner cylinder guided through the hollow cylinder, the hollow cylinder being arranged on the guide element and the inner cylinder being arranged on the holding element;
    wherein the hollow cylinder comprises at least one receiving space for receiving at least one stop element, and in the stop position the at least one stop element comes into frictional engagement with the inner cylinder.

15. The method according to claim 14, wherein frictional engagement is effected by a plurality of the stop elements arranged in the receiving space in the form of an annular space.

16. The method according to claim 15, wherein the stop elements are spheres.

17. The method according to claim 14, further comprising effecting frictional engagement in the stop position by clamping the at least one stop element in the receiving space, which tapers in the downward direction.

18. The method according to claim 14, further comprising applying a spring force to the lock elements in the downward direction by at least one spring element arranged in the receiving space (20).

19. The method according to claim 14, further comprising releasing the at least one stop element from frictional engagement in the stop position by a sliding sleeve arranged around the inner cylinder in the receiving space beneath the at least one stop element, by moving the sliding sleeve in a longitudinal direction of the inner cylinder by an actuating element.

20. The method according to claim 13, further comprising lifting the holding elements from a standby position into a lifted position by controllable pivoting of the at least one stop element in a form of pivotable sliding surface elements.

21. The method according to claim 20, further comprising bringing the sliding surface elements into guiding contact with a control head arranged at an upper free end of the guide element.

22. The method according to claim 20, further comprising engaging the adjusting means with the actuating element in order to release the at least one stop element and lower the holding elements from the lifted position into the standby position.

23. A method for processing articles of the food-processing industry, comprising:
the method for conveying the articles according to claim 13; and
processing the articles by at least one processing station;
wherein the vertical position of the articles is adjusted during conveying in accordance with a processing height specified for processing of the articles by the at least one processing station.

24. The method according to claim 23, wherein the articles are poultry or poultry parts.

* * * * *